US006880132B2

(12) United States Patent
Uemura

(10) Patent No.: US 6,880,132 B2
(45) Date of Patent: Apr. 12, 2005

(54) METHOD AND APPARATUS FOR ARRANGING AND DISPLAYING FILES OR FOLDERS IN A THREE-DIMENSIONAL BODY

(75) Inventor: Takuya Uemura, Kanagawa (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 09/947,553

(22) Filed: Sep. 6, 2001

(65) Prior Publication Data

US 2002/0054164 A1 May 9, 2002

(30) Foreign Application Priority Data

Sep. 7, 2000 (JP) ........................................ 2000-272245

(51) Int. Cl.[7] ................................................ G06F 3/14
(52) U.S. Cl. ...................... 715/848; 715/853; 715/716; 715/849; 715/850
(58) Field of Search ................................ 345/848, 854, 345/716, 853, 841, 849, 850, 851, 836, 839, 976, 830, 829, 828, 837, 419

(56) References Cited

U.S. PATENT DOCUMENTS

| | | | | |
|---|---|---|---|---|
| 5,295,243 A | | 3/1994 | Robertson et al. | ........... 395/160 |
| 5,515,486 A | | 5/1996 | Amro et al. | ................. 395/137 |
| 5,678,015 A | * | 10/1997 | Goh | ........................ 345/848 X |
| 5,724,492 A | * | 3/1998 | Matthews et al. | ........... 345/419 |
| 5,767,854 A | | 6/1998 | Anwar | ....................... 345/355 |
| 5,898,435 A | * | 4/1999 | Nagahara et al. | ........... 345/841 |
| 6,043,818 A | * | 3/2000 | Nakano et al. | .............. 345/851 |
| 6,363,404 B1 | * | 3/2002 | Dalal et al. | .............. 345/848 X |
| 6,636,246 B1 | * | 10/2003 | Gallo et al. | .............. 345/850 X |

OTHER PUBLICATIONS

George G. Robertson et al.: "Information Visualization Using 3D Interactive Animation" Communications of the Association for Computing Machinery, Association for Computing Machinery, New York, US, vol. 36, No. 4, Apr. 1, 1993, pp. 57–71, XP000355422 ISSN: 0001–0782.
"Mechanism for Visual Lists and Selections" IBM Technical Disclosure Bulletin, IBM Corp. New York, US, vol. 40, No. 5, May 1, 1997, p. 69–70, XP000723574 ISSN: 0018–8689.
Anonymous: "Technique for Displaying File Icon Status within the Original File Icon Image in High Color Depth Environments" Research Disclosure, No. 429, Jan. 1, 2000, XP002223708 Havant, UK, article No. 429172.

* cited by examiner

Primary Examiner—Raymond J. Bayerl
(74) Attorney, Agent, or Firm—Frommer Lawrence & Haug LLP; William S. Frommer; Samuel S. Fee

(57) ABSTRACT

Files and folders in the form of hierarchy can be confirmed visually easily to enhance the operability of search or content confirmation. An artist reading group 101, an album reading group 102, and a content (each music within an album) reading group 103 are displayed on a display screen. The groups 101 to 103 are displayed so as to form a three-dimensional body, for example, a side (polygonal side) of a polygonal column by a panel 101*a* or the like having images representative of contents of corresponding files or folders attached thereto.

16 Claims, 15 Drawing Sheets

METHOD AND APPARATUS FOR ARRANGING AND DISPLAYING FILES OR FOLDERS IN A THREE-DIMENSIONAL BODY

BACKGROUND OF THE INVENTION

1. Field of the Invention

The present invention relates to an information processing apparatus and method, and a program for a personal computer or the like, and particularly, to an information processing apparatus and method, and a program storage medium displaying a plurality of files or folders in a visually confirmable way.

2. Description of Related Art

In the conventional information processing apparatus for a personal computer or the like, a folder construction display of a tree construction has been employed to search or read various files or contents accumulated in an accumulation medium such as a hard disk.

Incidentally, in the display of contents or the like of the tree construction as described above, it is difficult to confirm contents visually, and the operability of selection still need be improved.

SUMMARY OF THE INVENTION

The present invention has been proposed in view of the actual circumstances as described above. It is an object of the present invention to provide an information processing apparatus and method, and a program wherein when various files or contents are listed and displayed, visualization may be enhanced to improve the operability.

According to the present invention, there is provided an information processing apparatus, comprising means for displaying an image and means for forming at least a part of a three-dimensional body by a plurality of panels having attached thereto images corresponding to a plurality of files or folders on a screen of the image displaying means, and displaying at least a panel by rendering the panel closest to and parallel with the screen.

According to the present invention, there is also provided an information processing method comprising the steps of forming at least a part of a three-dimensional body by a plurality of panels having attached thereto images corresponding to a plurality of files or folders on a screen of the image displaying means, and displaying at least a panel by rendering the panel closest to and parallel with the screen.

According to the present invention, there is also provided a program executing the steps of forming at least a part of a three-dimensional body by a plurality of panels having attached thereto images corresponding to a plurality of files or folders on a screen of the image display means, and displaying at least a panel by rendering the panel closest to and parallel with the screen.

DESCRIPTION OF THE PREFERRED EMBODIMENTS

The embodiments of the information processing apparatus and method according to the present invention will be described hereinafter with reference to the drawings.

Figure 1:
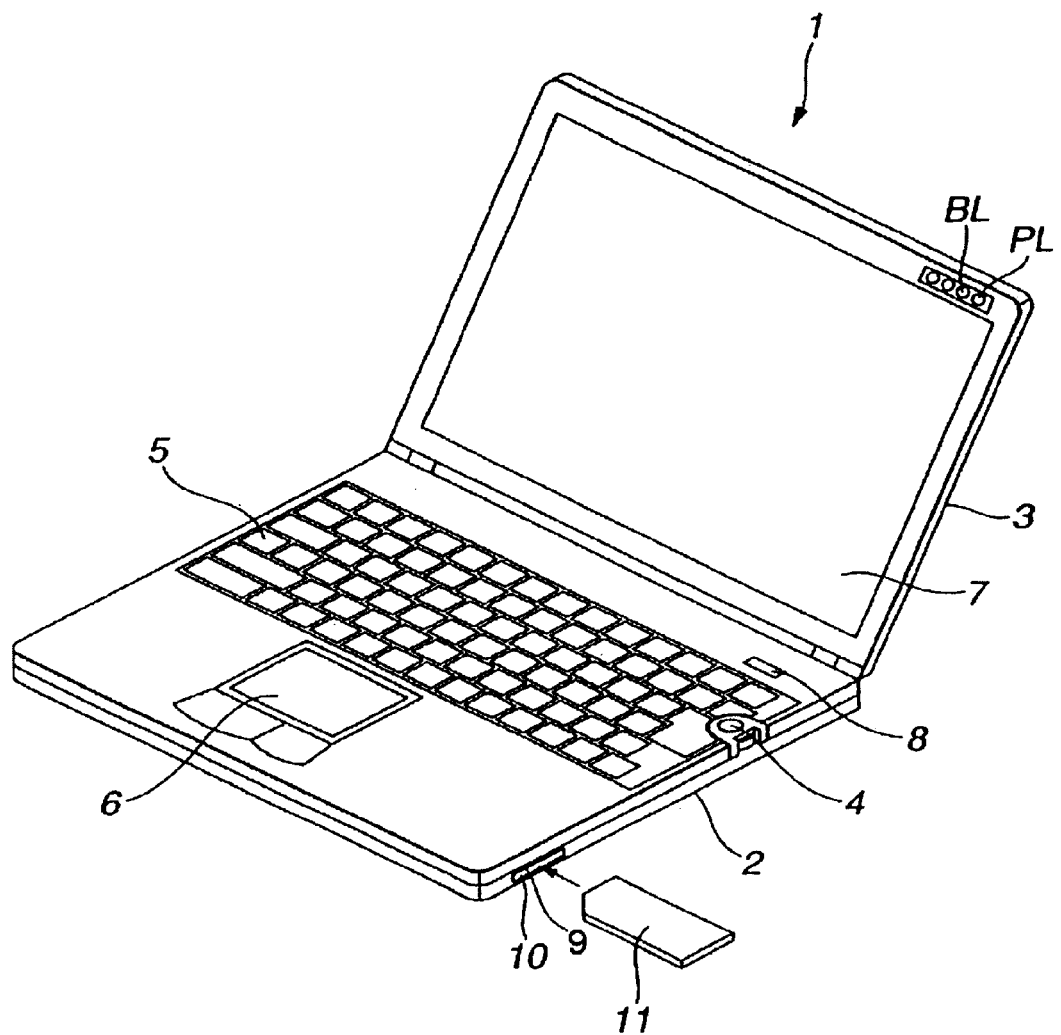
FIG. 1 is a schematic external perspective view of a note type personal computer as an information processing apparatus according to an embodiment of the present invention.

FIG. 1 shows an external appearance of a note type personal computer as one example applied to an information processing apparatus and method, and a medium according to an embodiment of the present invention. This note type personal computer 1 comprises, basically, a main body 2 and a display unit 3 to be opened and closed with respect to the main body 2. FIG. 1 is an external perspective view showing a state that the display unit 3 is opened wish respect to the main body 2.

The main body 2 is provided with a keyboard 5 to be operated when various letters or symbols are input, a touch-pad as a pointing device to be operated when a mouse cursor or the like in the display screen is moved, and a power supply switch 8 provided on the upper surface thereof. Although not shown, a so-called mouse as a pointing device is often connected for use. This mouse carries out the cursor operation or the like similar to the touchpad 6, and further, a mouse wheel may be provided.

A LCD (Liquid Crystal Display) 7 for displaying an image is provided on the front of the display unit 3. Further, for example, at the right upper portion of the display unit 3 are provided a power supply lamp PL, a battery lamp BL, a message lamp ML as necessary, and other lamps formed from LED.

A jog dial; 4 is arranged at the right upper position of the keyboard 5 of the main body 2 in the form that the dial side is exposed to the right side of the main body. Further, for example, at the right side of the main body 2 are provided with a PC card slot 9, a memory card slot 10 and so on. In the memory card slot 10 is mounted a memory card 11 encasing therein a semiconductor memory such as a flash memory to store a still image, a moving image, a voice, text data, a program or the like. For example, such memory card may be a so-called memory stick (trademark).

Next, one example of a hardware constitution of the note type personal computer 1 will be described with reference to FIG. 2.

Figure 2:
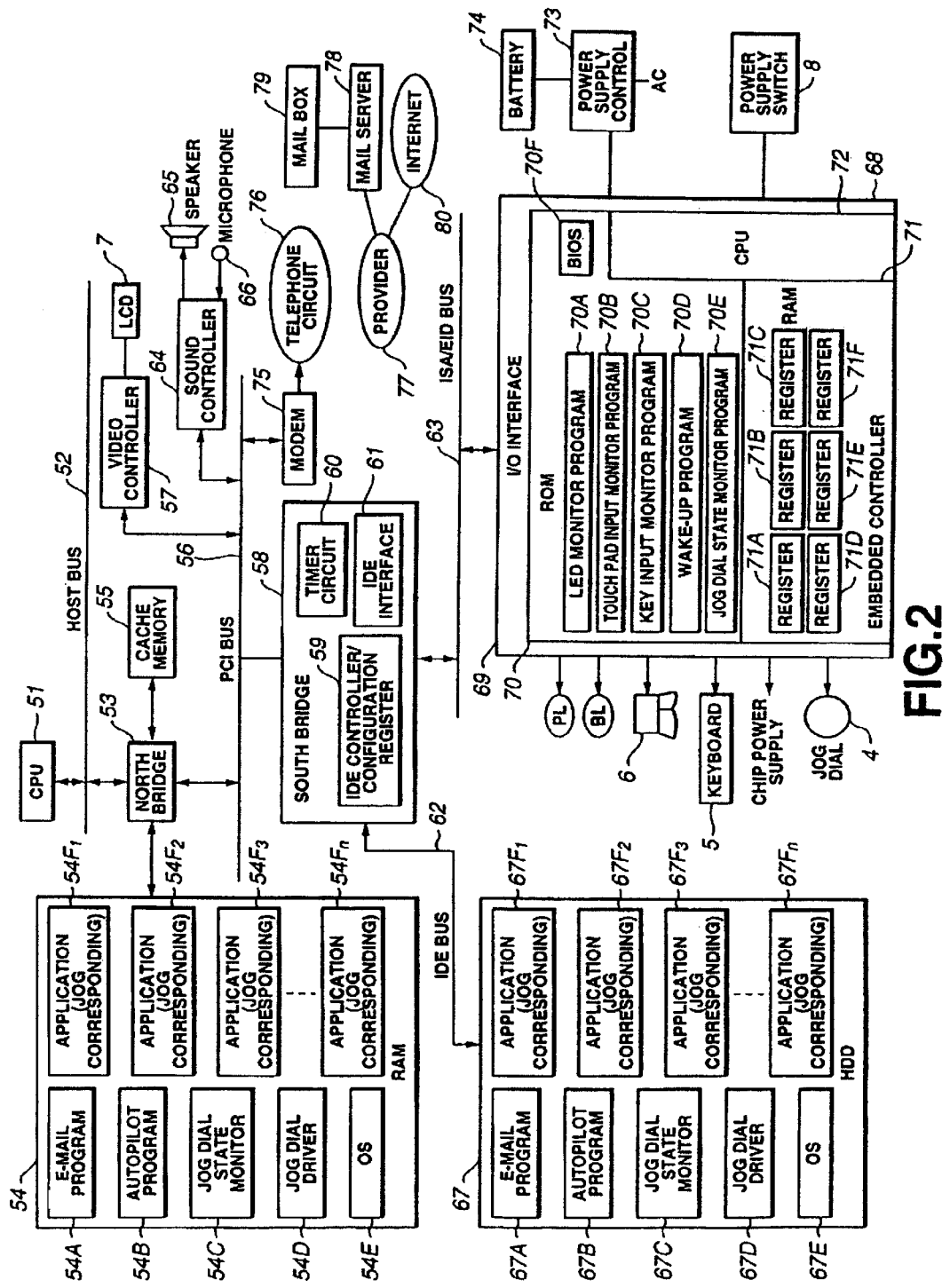
FIG. 2 is a block diagram showing one example of a schematic hardware constitution of a personal computer.

In FIG. 2, a central processing unit (CPU) 51 is constituted, for example, by a Pentium (trademark) processor made of Intel Co., or the like, and is connected to a host bus 52. A north bridge 53 is connected to the host bus 52, and a PCI bus 56 is connected to the north bridge 53. The north bridge 53 is constituted, for example, by 400BX made of Intel Co., so as to control the periphery of the CPU 51 and a main memory 54. It is noted that the north bridge 53 and a south bridge 58 described later constitute a so-called chip set.

The north bridge 53 is also connected to the main memory 54 and a cache memory 55. The cache memory 55 is to cache data that is used by the CPU51. Although not shown, the CPU 51 also encases therein a primary cache memory.

The main memory 54 is constituted, for example, by a DRAM (Dynamic Read Only Memory) so as to store a program executed by the CPU51 or data necessary in operation of the CPU 51. More specifically, for example, an e-mail program 54A, an autopilot program 54B, a jog dial state monitor program 54C, a jog dial driver 54D, an operating program (OS) 54E, and other application programs 54F1 to 54Fn are transferred, at the time when starting is completed, to the main memory 54 from a HDD 70 and stored.

The e-mail program 54A is a program for sending/receiving a communication sentence from a communication circuit such as a telephone circuit 76 through a modem 75 described below via a network. The e-mail program 54A has a received mail obtaining function as a specific function. The received mail obtaining function confirms whether or not a mail addressed to oneself (user) is received within a mail box 79 with respect to a mail server 78 provided to a provider 77, and if a mail addressed to oneself is received, process for obtaining the mail is executed.

The autopilot program 54B is a program for starting a plurality of processes (or programs) or the like preset sequentially in the order preset to process them.

The OS (a basic program software) 54E controls basic operation of a computer represented, for example, by Windows 95 and 98 (both of which are trademarks) of Microsoft Co., and OS (Trademark) of Apple Computer Co., and so on.

The jog dial state monitor program 54C receives a notice from applications whether or not the applications can be executed by the jog dial, and if the applications can be executed, the jog dial state monitor program 54C operates to display what can be done by the jogdial. Normally, the jog dial state monitor program 54C awaits an event of the jog dial 4, and has a list for receiving a notice from the applications. The jog dial driver 54D executes various functions corresponding to the operation of the jog dial 4.

The video controller 57 is connected to the PCI bus 56, and controls a display of LCD 7 on the display unit 3 on the basis of data supplied through the PCI bus 56.

A sound controller 64 is connected to the PCI bus 56 to take-in an input from a microphone 66 or supply a voice signal to a speaker 65. Further, a modem 75 is also connected to the PCI bus 56. The modem 75 can be connected to a communication network 80, a mail server 78 and so on of an Internet or the like through a public telephone circuit 76 and an Internet service provider 77.

Further, a south bridge 58 is also connected to the PCI bus 56. The south bridge 58 is constituted, for example, by PIIX4E made of Intel Co. so as to control various I/Os (Input/Outputs). That is, the south bridge 58 is constituted by an IDE (Integrated Drive Electronics) controller/configuration register 59, a timer circuit 60, and an IDE interface 61 or the like so as to control devices connected to the IDE bus 62, and devices connected through an ISA/EIO (Industry Standard Architecture/Extended Input Output) bus 63 and an embedded controller 68.

The IDE controller/configuration register 59 is constituted by two IDE controllers, i.e., a so-called primary IDE controller and a secondary IDE controller, and a configuration register (which are not shown).

The primary IDE controller is connected to a connector (not shown) through an IDE bus 62, and a HDD 67 is connected to the connector. In the secondary IDE controller, when a bay device which is a so-called IDE device such as a CD-ROM drive, a second HDD or FDD not shown is mounted through other IDE buses, a connector of the bay device mounted is eclectically connected.

In the HDD 67 are stored, in addition to an e-mail program 67A, an autopilot program 67B, a jog dial state monitor program 67C, a jog dial driver 67D, and an OS (basic program software) 67E, a plurality of application programs 67F1 to 67Fn. The programs 67A, 67B, 67C, 67D, 67E, 67F1 to 67Fn within the HDD 67 are transferred into the RAM 54 sequentially during the course of start (boot up) process, and stored.

The embedded controller 68 is connected to the ISA/EIO bus 63. This embedded controller 68 comprises a micro controller, and is used as an I/O controller. That is, the embedded controller 68 is constituted by mutually connecting an I/O interface 69, a ROM 70, a RAM 71, and a CPU 72.

Within the ROM 70 are pre-stored a LED control program 70A, a touchpad input monitor program 70B, a key input monitor program 70C, a wake-up program 70D, and a jog dial state monitor program 70E.

The LED control program 70A is a program for controlling lighting of a lamp comprising a power supply lamp PL, a battery lamp BL, a message lamp ML as necessary, and other LEDs. The touchpad input monitor program 70B is a program for monitoring an input by a user from the touchpad 6. The key input monitor program 70C is a program for monitoring an input from the keyboard 5 or other key switches. The wake-up program 70D is a program for carrying out a control of each chip power supply in order that whether or not the time is a preset time is checked on the basis of present time data supplied from the timer circuit 60 within the south bridge 58, and if so, a predetermined process (or program) is started. The jog dial state monitor program 70E is a program for always monitoring if a rotary type encoder unit 12 of the jog dial 4 is rotated or depressed.

A BIOS (Basic Input/Output System) 70F is written into the ROM 70. The BIOS termed herein is a basic input/output system, which is a software program for controlling the receive/transmit (input/output) of data between OS or an application and peripheral equipment (such as a display, a keyboard, HDD, etc.).

The RAM 71 has, as registers 71A to 71F, registers for LED control, a touchpad input status, a key input status, and set time, or an L/O register for monitoring a jog dial state. For example, the LED control register 71A controls lighting of a message lamp ML which displays a momentary rising state of an e-mail described below when the jog dial 4 is depressed. The key input status register 71C is designed so that an operating flag is stored, when the jog dial 4 is depressed for one-touch operation described below. The set time register 71D is able to set a time suitably.

Further, the jog dial 4, the touchpad 6, and the keyboard 5 are connected to the embedded controller 68 through a connector not shown to output signals corresponding to operations of the jog dial 4, the touchpad 6, and the keyboard 5, respectively, to the ISA/EIO bus 63. The power supply lamp PL, the battery lamp BL, the message lamp ML and other lamps comprising LED are connected to the embedded controller 68. A power supply control circuit 73 is connected to the embedded controller 68.

The power supply control circuit 73 which is connected to an enveloped battery 74 or an AC power supply supplies necessary power to each block, and carries out a control for charging the enveloped battery 74 and second batteries of peripheral apparatuses. Further, the embedded controller 68 monitors a power supply switch 8 to be operated when the power supply is turned on or off.

Next, a specific example of a display screen for confirming or selecting at random files or contents by the personal computer 1 according to the embodiment of the present intention as described above will be explained with reference to FIGS. 3 to 15. In this specific example, there is shown one example of one kind of a content browser software program such that music albums such as CD are classified every artist, a recorded music of each music album is conformed or searched, and music reproduced for only the designated time out of all music albums designating suitable time are selected at random to prepare a play list.

Figure 3:
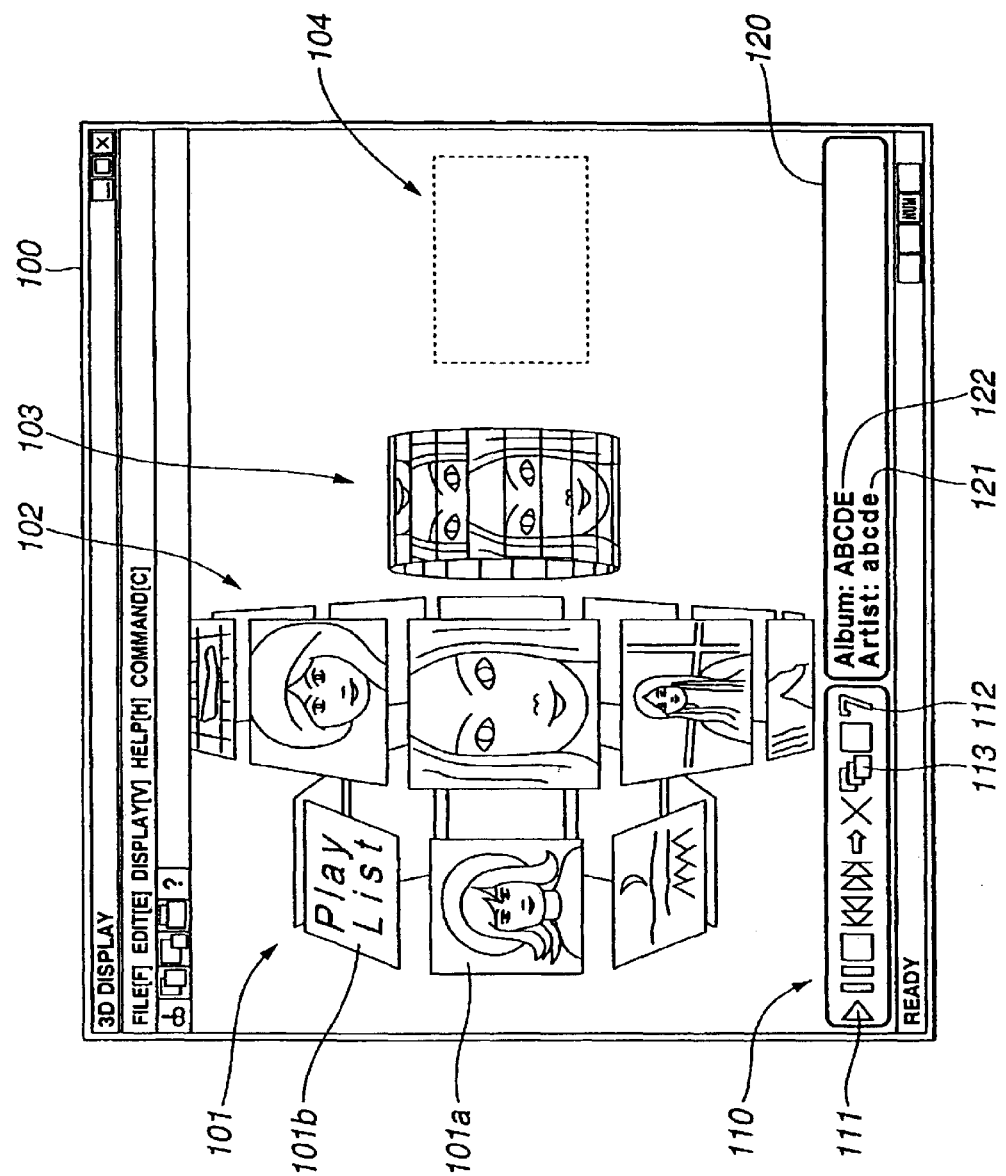
FIG. 3 is a view for explaining a display screen when a program for displaying a reading of contents is started in the embodiment of the present invention.

FIG. 3 shows a window 100 of the browser software program displayed on the LCD7 of the personal computer 1 shown in FIG. 1, showing the state that the program is started. In FIG. 3, an artist reading group 101, an album reading group 102, and a content (music in the album) reading group 103 are displayed in the order from left in the screen, each group being displayed so as to form a three dimensional body, for example, a side of a polygonal column (a polygonal tube) by a panel having images representative of contents of corresponding files or folders.

In the specific example, a music album such as CD is an object, but generally, the content reading group 103 corresponds to a hierarchy for reading data files of a music, a still. image, a moving image, a text or the like, the album reading group 102 corresponds to an upper hierarchy in which the files are classified to provide a folder every class, and the artist reading group 101 corresponds to an upper hierarchy in which the folders are classified in further upper category to provide a folder. The hierarchy may be two hierarchies, or four hierarchies or more, and only the first hierarchy may display a three dimensional body in the form of a polygonal column.

In a third specific example, centre axes of polygonal columns of the groups 101 to 103 corresponding to three hierarchies are made in common, and a panel of each group rotates around the common centre axis. At least one panel every group, for example, a panel 101a of the artist reading group 101 is displayed erectly in the state of being closest to and parallel with the screen. With respect to the selection of panels, not only the panel rendered closest to the screen, but also other panels can be suitably selected. Further, the censer axis of the polygonal column constituting each group may not be made in common.

A blank portion 104 on the right side in the figure of FIG. 3 is used for preparing a play list described below, or for reading of a copy music for an external reproducing equipment, for example, a portable device or the like. A panel 101b of the artist reading group 101 is for a display of reading of a play list described below.

Further, in a button area 110 at the left lower part of FIG. 3, there are provided a mode selecting button such as a reproducing button 111, a button 112 for automatically preparing a play list described below, and a button 113 for storing a play list prepared. Further, in a display area 120 at the right lower part of FIG. 3, there are displayed an artist name 121 or an album name 122 as information in connection with a panel pointed by a mouse cursor as described below.

The display polygonal column is enlarged, reduced, moved laterally, or rotated in response to the mouse operation or the operation of the touchpad of FIG. 1, from the display state as shown in FIG. 3. For example, a mouse wheel is rotated, whereby the polygonal column rotates around the centre axis, it is moved laterally by dragging laterally, or it is enlarged or reduced by dragging vertically, but the mode is not limited thereto.

Figure 4:
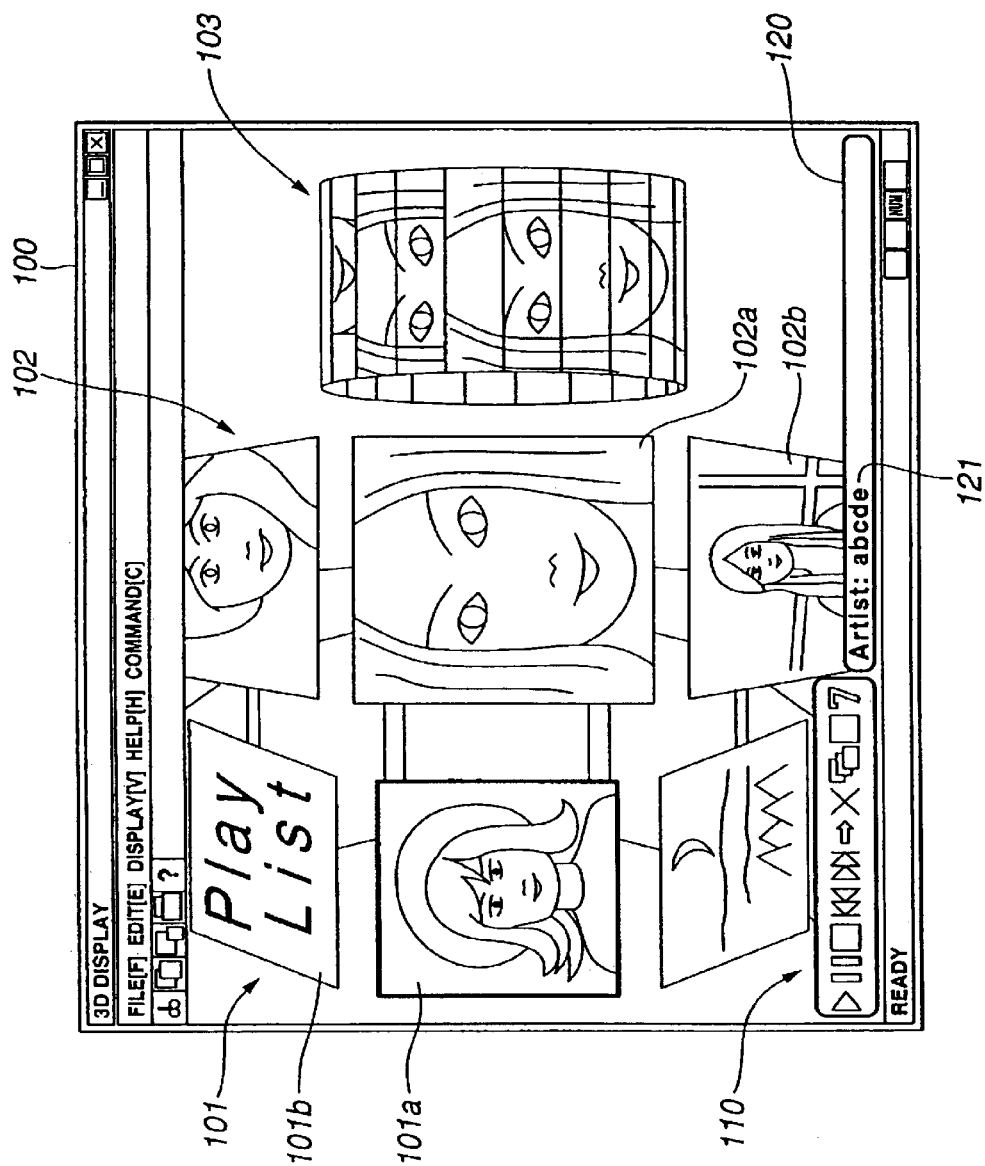
FIG. 4 is a view showing a state that one panel out of an artist reading group is selected.

FIG. 4 shows a state that the operation of a mouse or the operation of the touchpad 6 is carried out to display the artist reading group 101 in an enlarged scale. FIG. 4 shows a state that a mouse cursor is positioned on the panel 101a of the artist reading group 101 (a so-called pointing state), which is a display form such that the panel 101a can be discriminated visually from other panels, for example, a frame is added around the panel. At this time, an artist name 121 is displayed in the display area 120 as information in connection with the panel 101a pointed by the mouse cursor.

Figure 5:
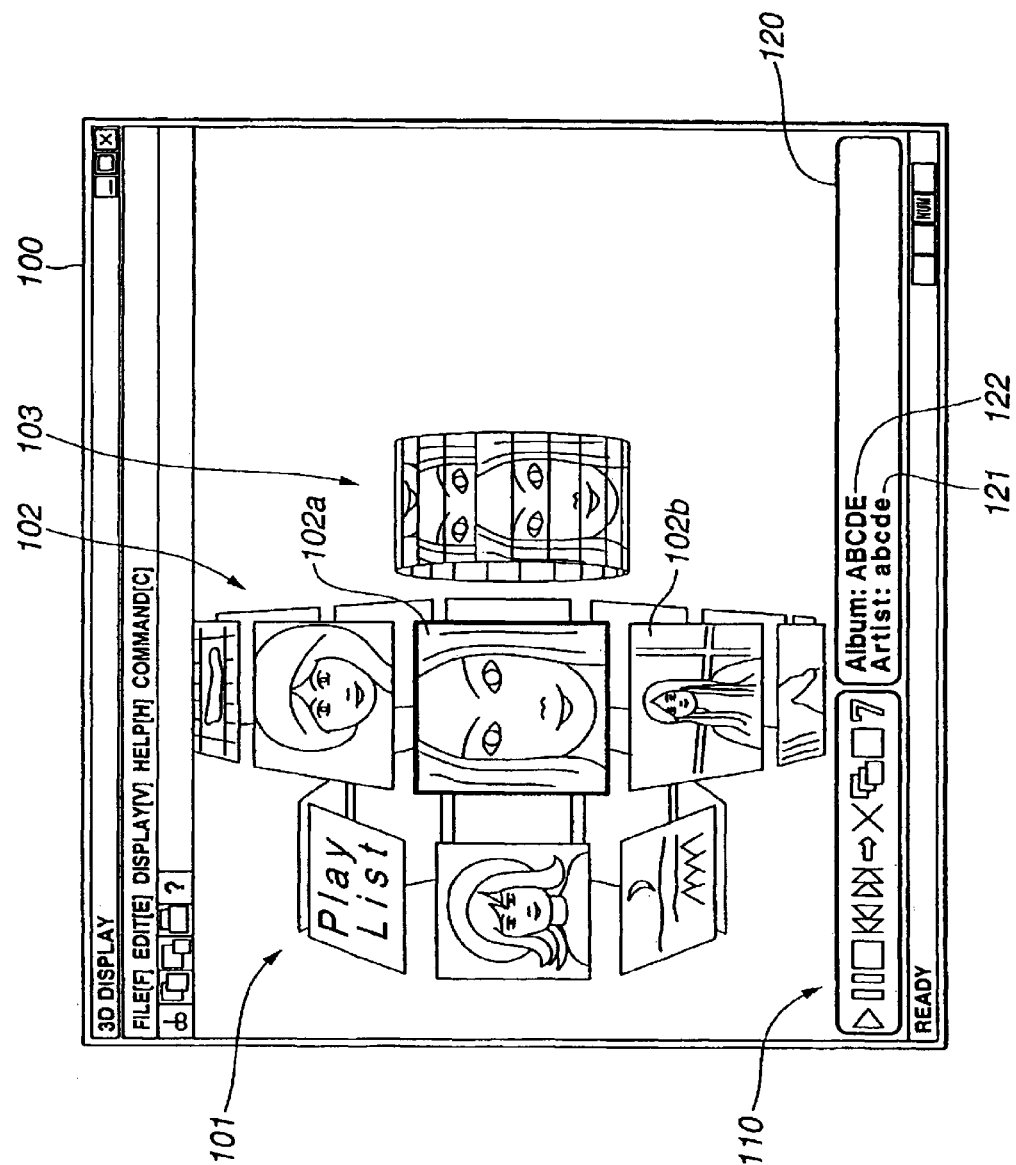
FIG. 5 is a view showing a state that one panel out of an album reading group is selected.

FIG. 5 shows a state that a mouse cursor is positioned on the panel 102a in the album reading group 102. A frame is displayed around the panel 102a, and the artist name 121 and the album name 122 are displayed in the display area 120 as information in connection with the panel 102a pointed. Here, images of CD jacket of the corresponding album are attached to the panels 102a and 102b in the album reading group 102, but the mode is not limited thereto but for example, an image of a user's taste may be attached. It is noted of course that the image includes not only a picture or a photograph but also lettering characters or symbols.

Figure 6:
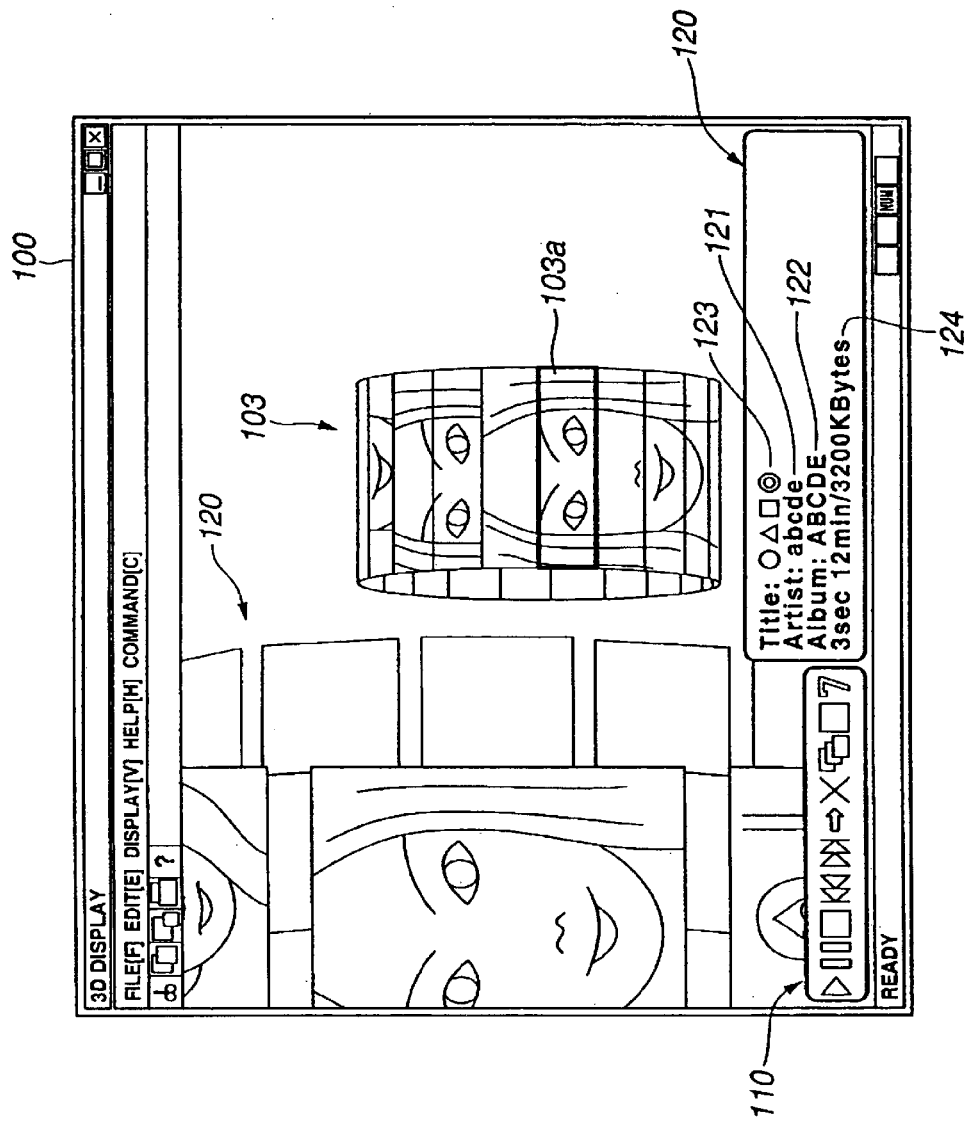
FIG. 6 is a view showing a state that one panel out of a content reading group is selected.

FIG. 6 shows a case where a mouse cursor is positioned on the panel 103a in the content reading group 103, and in the display area 120 are displayed contents corresponding to the panel 103a pointed, in which case, an artist name 121, an album name 122, a content name (music) 123, and a musical performance time/data capacity 124 as information with respect to one music in the album. While in the specific example, to the panel 103a in the content reading group 103 is attached an image of CD jacket of an album in its upper hierarchy in the form of a strip of paper, it is noted that a user may attach an image suitably.

When each panel of the artist reading group 101 or the album reading group 102 is double-clicked by a mouse or the touchpad 6 of FIG. 1, a group of a lower hierarchy is displayed as its content, and when a panel of the content reading group 103 is double-clicked, contents of the panel are added to the play list as described later.

Figure 7:
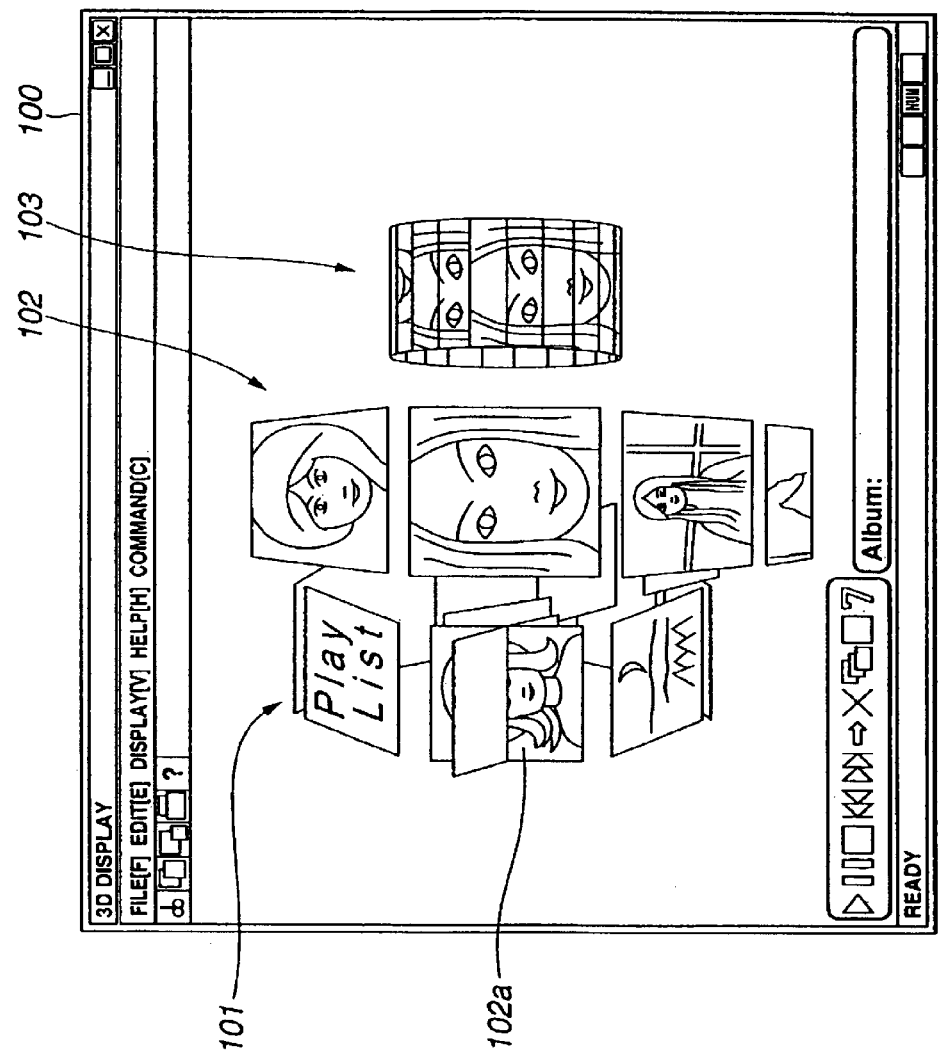
FIG. 7 is a view showing a state that one panel out of an artist reading group is double-clicked to form an album reading group of the artist.

For example, FIG. 7 shows a state that the panel 101a in the artist reading group 101 is double-clicked, in which a panel of an album of an artist appears from the selected panel 101a to form the album reading group 102 which is a lower hierarchy in the form of a polygonal column.

Figure 8:
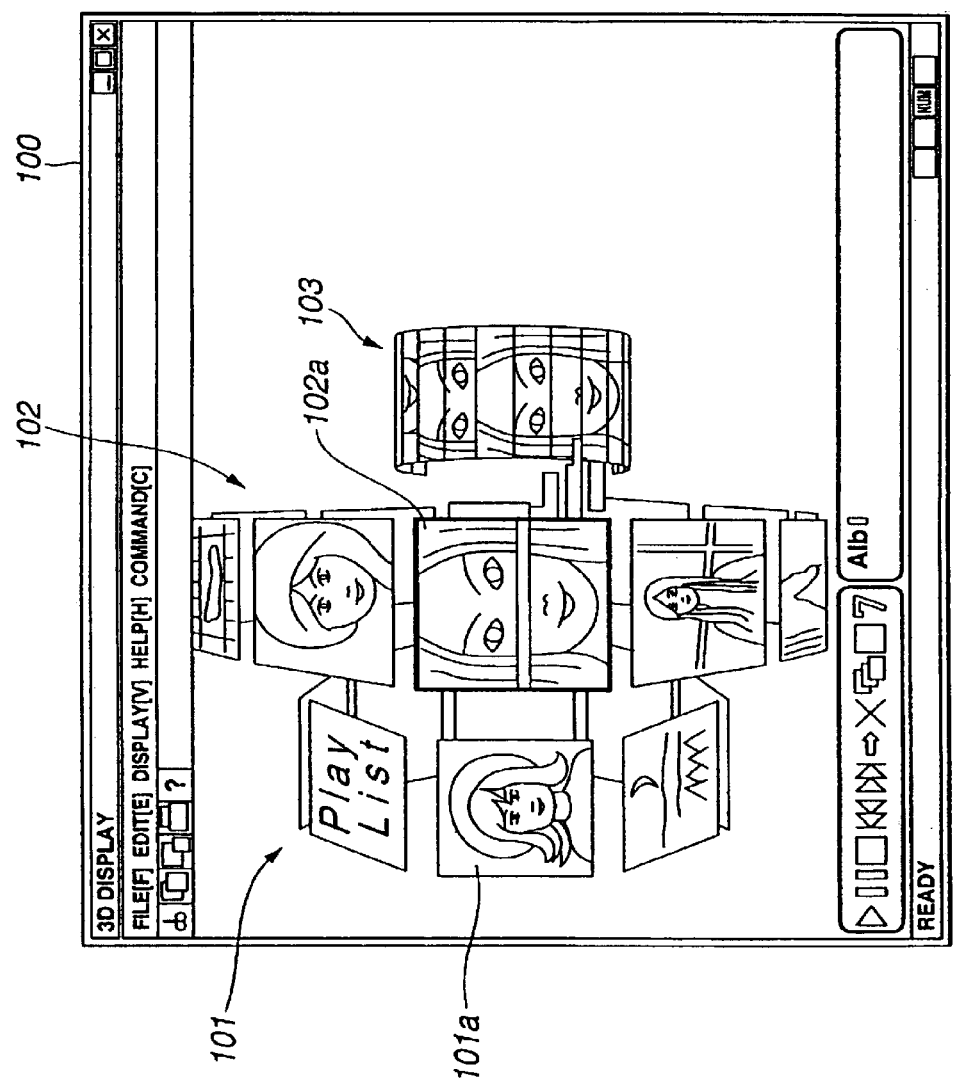
FIG. 8 is a view showing a state that one panel out of an album reading group is double-clicked to form a content (music) reading group within the album.

Further, FIG. 8 shows a state that the panel 102a in the album reading group 102 is double-clicked, in which a panel of an album thereof appears from the selected panel 102a to form the album reading group 103 which is a lower hierarchy in the form of a polygonal column.

Figure 9:
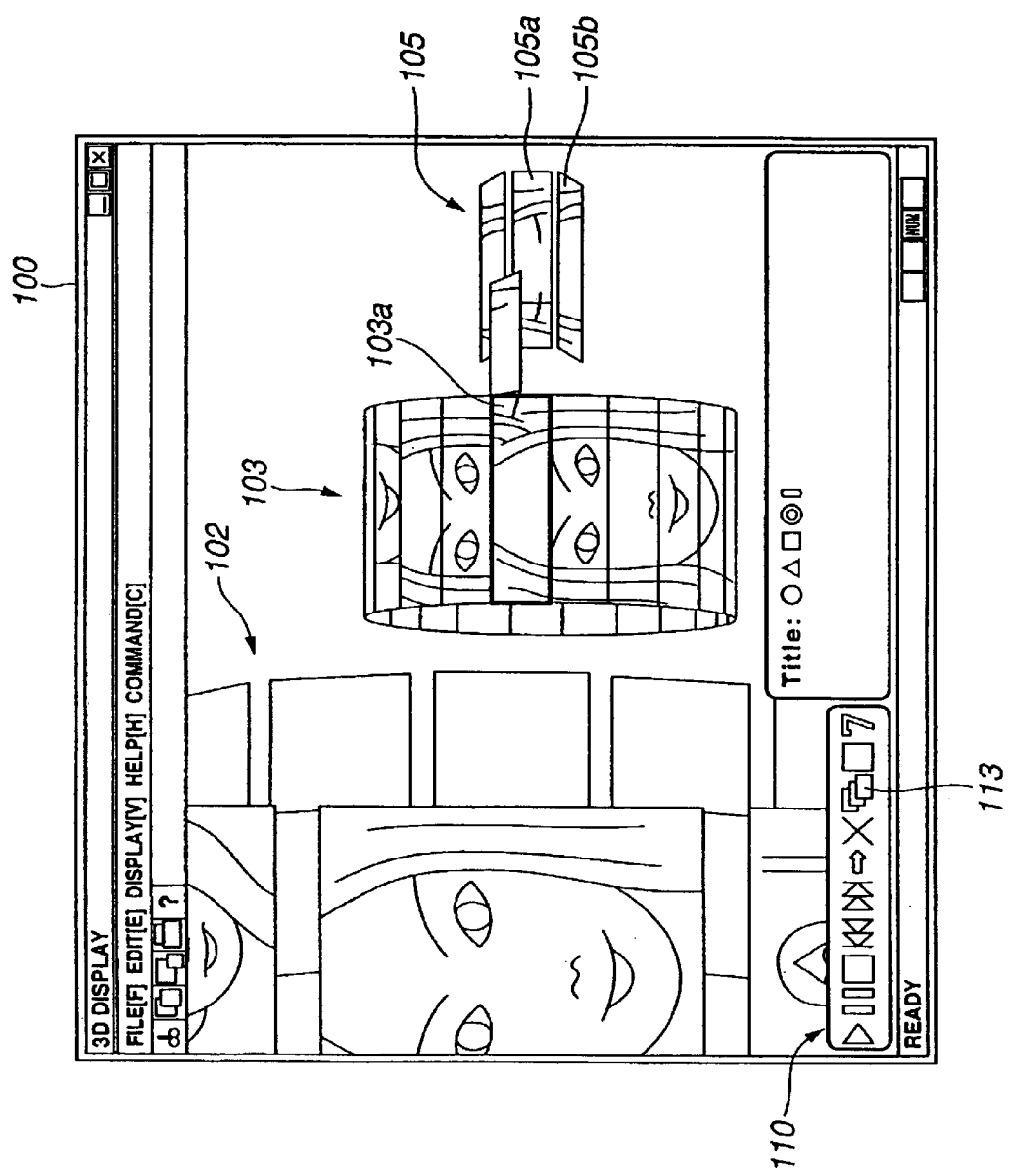
FIG. 9 is a view showing a state that one panel out of a content reading group is double-clicked to add a content (music) to a play list.

Further, FIG. 9 shows a state that the panel 103a in the content reading group 103 is double-clicked, whereby the content (music) of the selected panel 103a is added to a play list 105 on the right side in the figure. Panels 105a and 105b of the content (music) constituting the play list 105 also display so as to form the side of a polygonal column. The prepared play list can be stored by clicking a button 113 in a button area 110.

Figure 10:
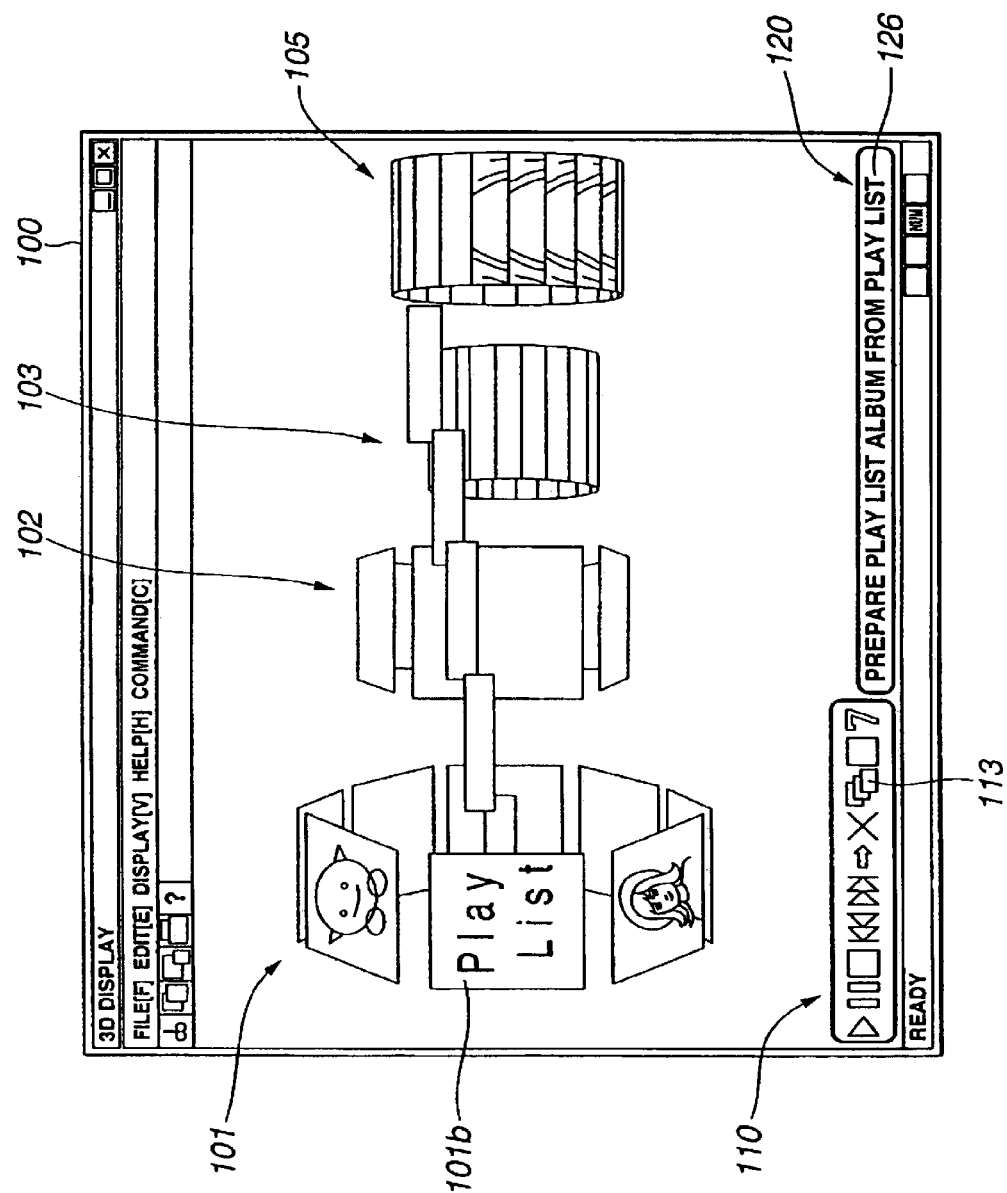
FIG. 10 is a view showing a state that a play list prepared is stored in a play list panel of the artist reading group.

FIG. 10 shows a state that a button 113 for storing the play list is clicked, displaying the behaviour that a panel appearing from the play list 105 is moved to the panel 101b of the play list in the artist reading group 101 to add a play list thereto. At this time, in a display area 120 is displayed an explanation sentence 126 such as "Prepare a play list album from a play list" or the like.

Figure 11:
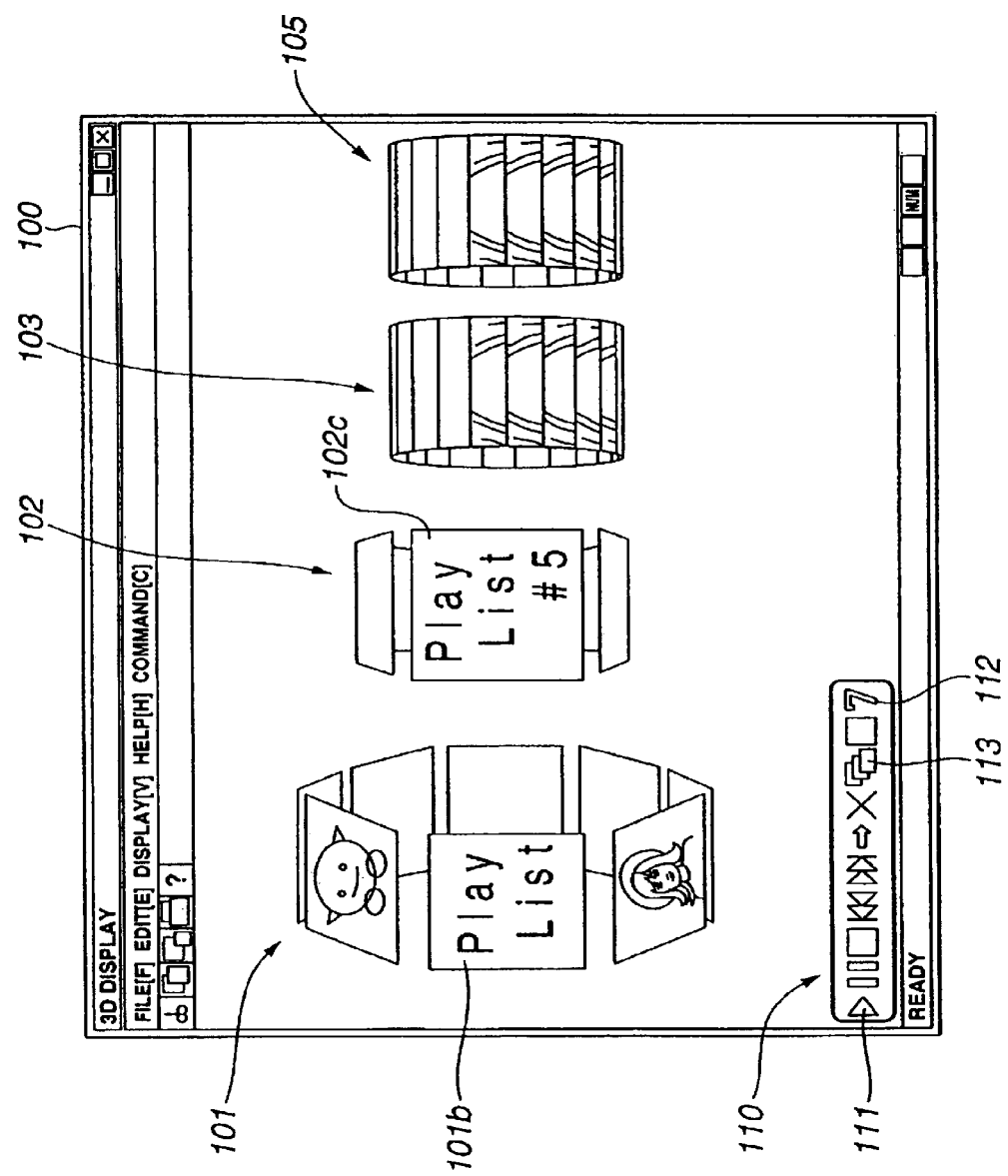
FIG. 11 is a view showing a state that the play list immediately after being stored is opened.

Here, as shown in FIG. 11, in a state that the panel 101b of the play list in the artist reading group 101 is double-clicked whereby reading of the play list is displayed in the album reading group 102, a panel 102c showing the play list stored immediately before (in an example shown in FIG. 11, a Play List #5) is double-clicked whereby the play list just stored is opened to enable displaying it in the content reading group 103. The display of the content reading group 103 is the same as the display of the play list 105.

Figure 12:
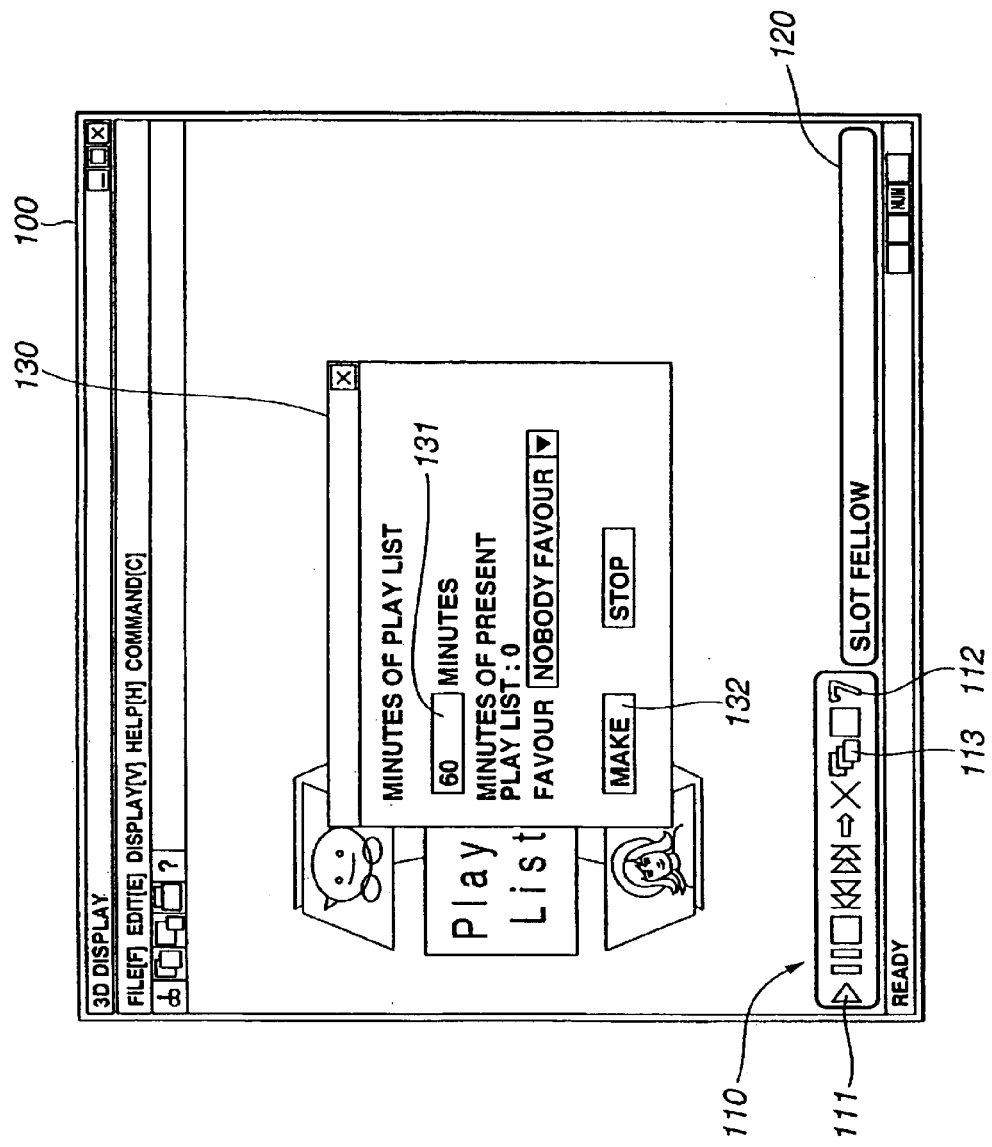
FIG. 12 is a view showing a state that a time setting window for automatic preparing operation of the play list is opened.

Further, it is also possible to designate the desired time to automatically prepare a play list. Here, a button 112 for play list automatic preparation of a button area 110 is clicked whereby a dialogue window 130 for time setting of a play list as shown in FIG. 12 is opened so that time fraction of a play list, time fraction of the present play list, and a favour (a weight is applied to the selecting probability of an artist to raise the selecting probability of the favourite artist) may be designated. In the window 130, time is entered in a time-designated frame 131, and when a "make" button 132 for start is clicked, a panel in the form of a polygonal column of each reading group described above starts to rotate as in a so-called slot machine. Here, a user depresses, for example, a space key of a keyboard whereby the rotation of a polygonal column stops in the order of the artist reading group 101, the album reading group 102 and the content reading group 103, and the panels of the respective groups are selected at random. At a moment when the content (music) is decided, the content (music) selected in the play list is added.

Figure 13:
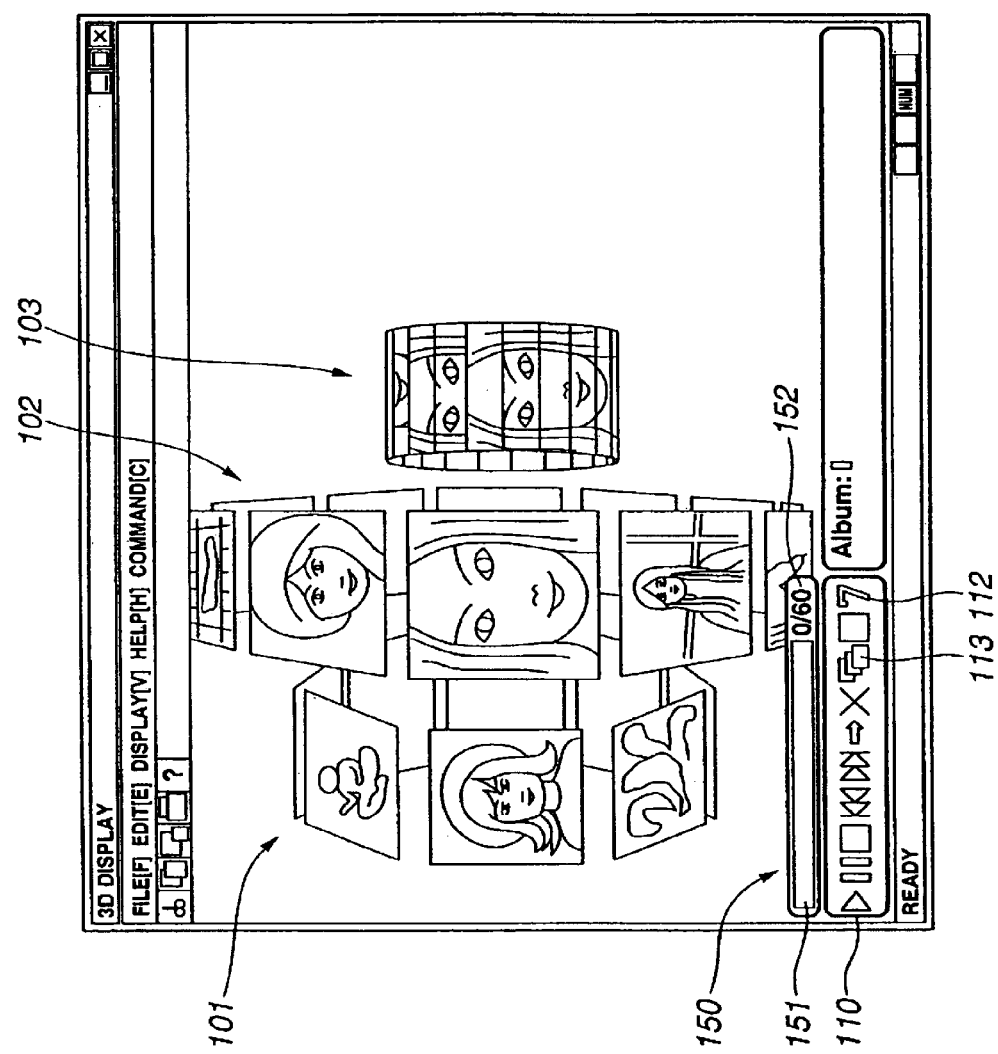
FIG. 13 is a view showing a display screen during the automatic preparing operation of the play list

During the rotation of a polygonal column described above, a time display frame 150 of a play list is displayed, as shown in FIG. 13, and the present time of a play list/time (designated time) of a play list to be prepared are displayed by a display 151 by way of a bar graph and a numerical display 152. The above-described automatic selecting operation (slot machine operation) is repeatedly carried out till the present time of a play list reaches the time of a play list to be prepared.

Figure 14:
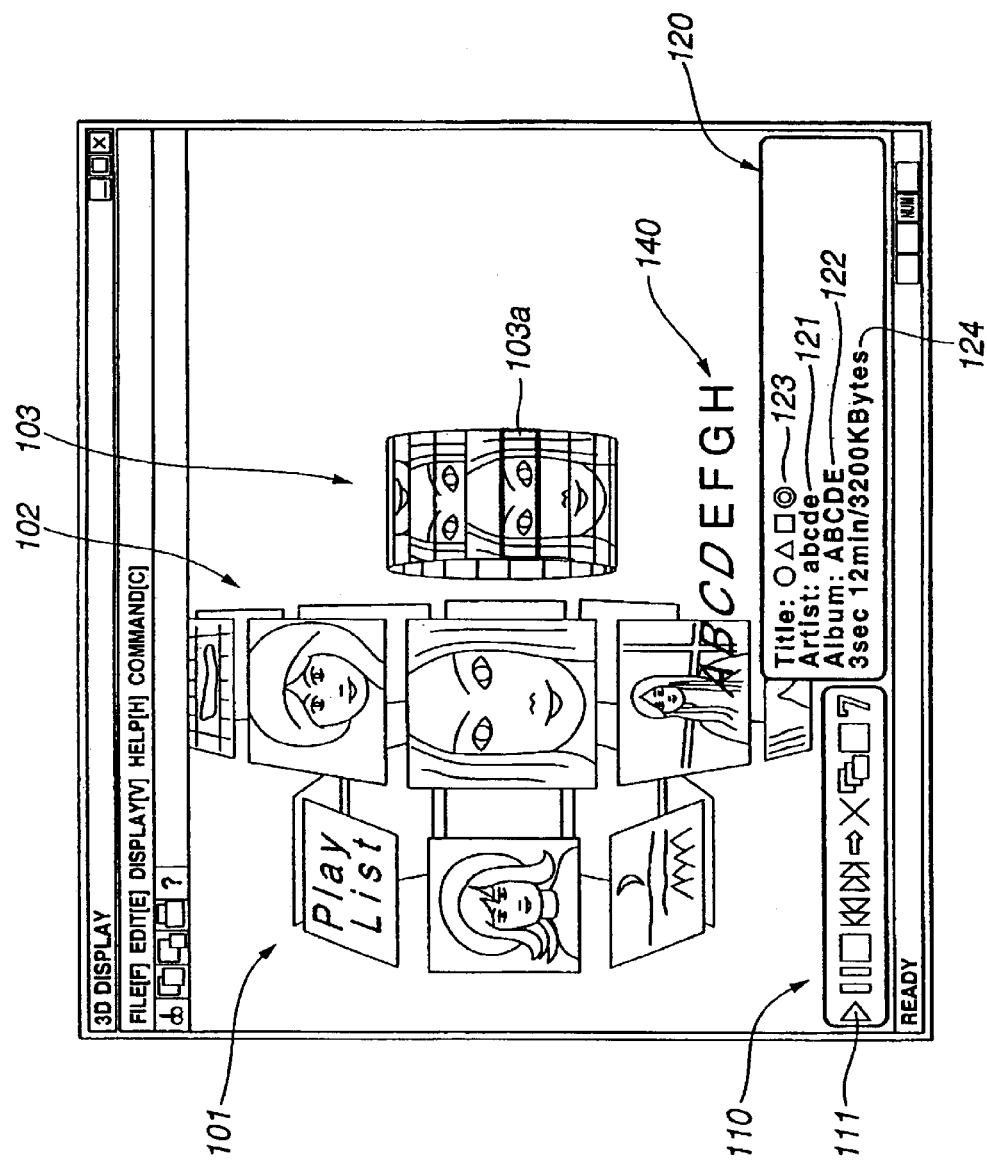
FIG. 14 is a view showing a state that a content (music) selected is being reproduced.

Next, FIG. 14 shows a state that in the state that a desired panel 103a of the content reading group 103 is selected, a reproducing button 111 of a button area 110 is clicked to thereby reproduce a content (music) corresponding to the panel 103a. At this time, in a display area 120 are displayed, as information of contents selected, an artist name 121, an album name 122, a content name (music name) 123, and a music performance time/data capacity 124 are displayed.

Further, the words of a song 140 of a music prepared in advance like a so-called "karaoke" (orchestra) can be also displayed.

Further, the desired panel of the play list 105 is selected and the reproducing button 111 is depressed whereby reproducing can be also carried out. Further, the panels constituting the play list 105 may be freely moved or flied around individually or in the associated state to display that reproducing is being made.

Figure 15:
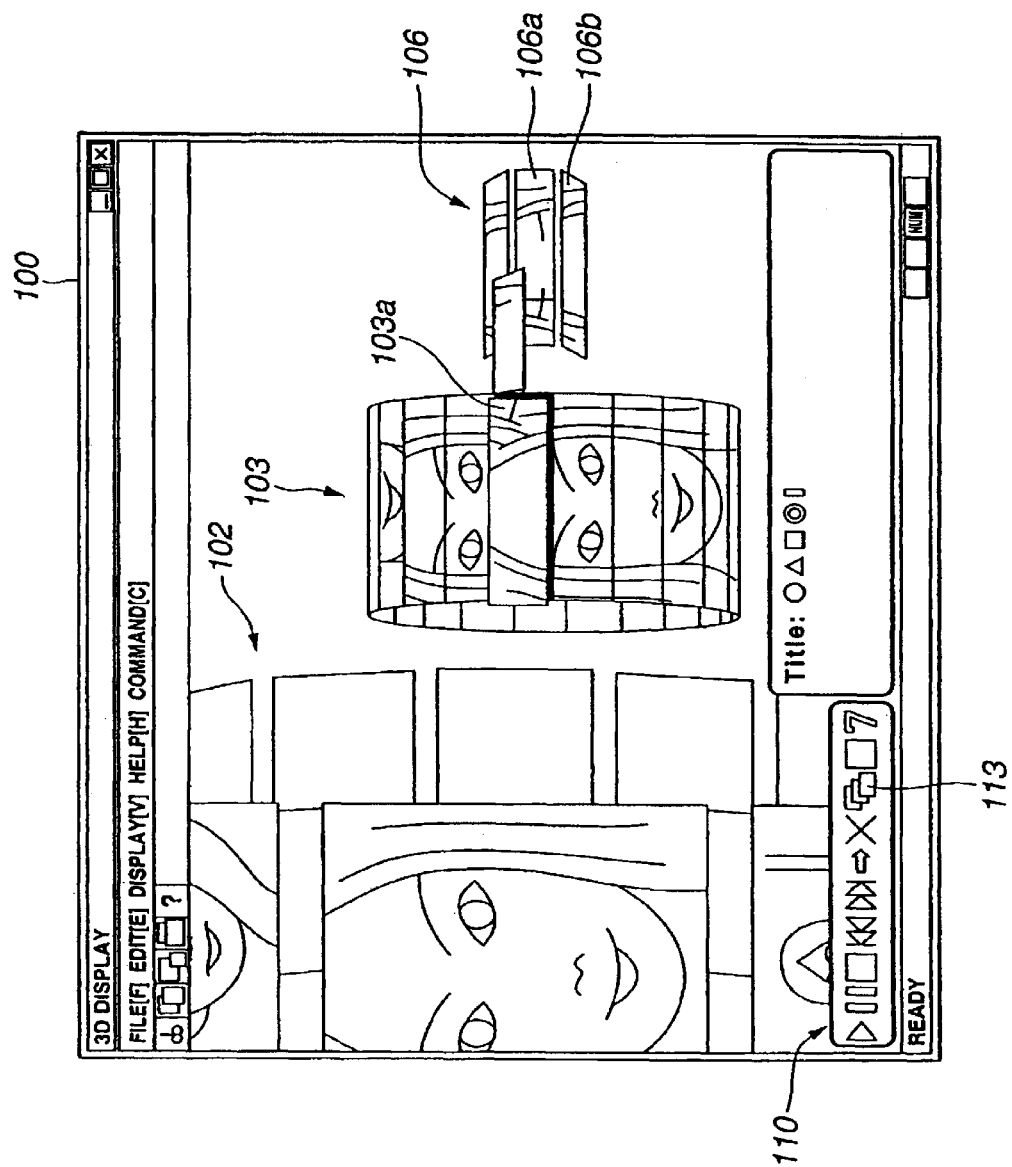
FIG. 15 is a view showing a state that a content (music) is copied to an external portable device.

Next, FIG. 15 shows a display example in a case where contents are copied in a small type recording/reproducing device using a semiconductor memory or a disk-like recording medium. As the copying in this case, there are mentioned a "copy" for recording contents in a medium of an external copier while holding the contents of contents of a copying source, and a "move" for erasing the contents of contents of a copying source when the contents are recorded in the medium of a copier. The frequency of these "copy" and "move" is restricted whereby the copyright protection is accomplished. Here, the control (check-in/check/out) of copying is carried out such that in a case where a plurality of times of "move" is permitted, the "move" restriction frequency is reduced every time the contents are subjected to the "move" from the copying source, and the "move" restriction frequency is increased every time when the contents are subjected to "move" (return) from the medium of the copier to the medium of the copying source.

In association with the check-in and check-out as described above, in the specific example of FIG. 15, displaying is carried out such that thin elements or films of the number according to the copy restriction frequency, particularly the "move" restriction frequency are superposed on the panel 103a of the content reading group 103. In this case, the content (music or the like) is subjected to "move" from the panel 103a of the content reading group 103 to the display list 106 of the external portable device whereby the number of the thin elements of films of the panel 103a is displayed in a manner of reducing one so that the "move" restriction frequency can be confirmed visually. Further, of course, when the contents are subjected to "move" (return) from the portable device to the content reading group 103, the number of thin elements or films of the panel 103a corresponding thereto is displayed in a manner of increasing one. The play list 106 of the external portable device is also displayed such that the panels 106a, 106b corresponding to the recorded music (content) form the side of a polygonal column, and the centre axis of the polygonal column is also placed in coincidence with the centre axes of polygonal columns of other groups 101 to 103.

The display of the copy restriction frequency is not limited to the above-described "move" restriction frequency but can be applied to the "copy" restriction frequency. Further, the display according to the restriction frequency is not limited to the display with the thin elements or films superposed, but fragments subjected to the "move" by subdividing content panels in the form of a strip of paper longitudinally or laterally can be displayed in a visually confirmable way such as a black display.

The program for realizing the display as described above can be stored in a disk-like recording medium such as CD-ROM or an optical magnetic disk, a semiconductor memory, a tape-like recording medium or the like for presentation. That is, in the program storage medium, at least a part of a three-dimensional body is formed by a plurality of panels having images corresponding to a plurality of files or folders attached on a screen of image display means, and a program for displaying at least one panel displayed in the state most closing to a display surface in parallel is stored in a computer to be readable.

The present invention is not limited to the aforementioned embodiments. For example, in the above-described embodiment, a description has been made of a case where a music album is read, but alternatively, the present invention can be applied such that in order to classify and display files of a still image or a moving image, as an upper hierarchy, genres of growth record of children, travels, events, and others are provided, an album by way of time division, an album every travel destination, and an album every event are assigned as a medium hierarchy every genre, and as a lower hierarchy, files of individual still images or moving images are assigned. Further, of course, the display of each reading group is not limited to the polygonal column-like display, but the constitution may be provided in which at least a part of various three-dimensional body is constituted by a plurality of panels constituting element every group.

According to the present invention, at least a part of a three-dimensional body is formed by a plurality of panels having images corresponding to a plurality of files or folders attached to a screen of image display means, and at least one panel is displayed in the state of most closing to a display surface in parallel whereby the contents of contents can be confirmed in a visually easy way, the operation is easy, and the search is also easily carried out.

Further, a plurality of panels are arranged so as to form the side of a polygonal column and are displayed rotatably around the centre axis of the polygonal column whereby the panel selection can be carried out in a visually easy way. Furthermore, the plurality of files or folders are in the form of hierarchy, and the plurality of panels are grouped every hierarchy and displayed whereby the confirmation of contents of the files or folders in the form of hierarchy can be carried out easily.

What is claimed is:

1. An information processing apparatus, comprising:
    means for displaying an image including a screen;
    means for forming at least a part of a three-dimensional body by a plurality of panels having attached thereto images, corresponding to a plurality of files or folders, on the screen of the image displaying means, and displaying at least a panel by rendering the panel closest to and parallel with the screen; and
    means for preparing a playlist, which lists the order in which said plurality of files or folders are executed, said means for preparing a playlist configured to record, store, and play back the playlist,
    wherein said playlist is arranged to be displayed on said means for forming at least a part of a three-dimensional body.

2. The information processing apparatus according to claim 1, wherein said plurality of panels are arranged so as to form a side of a polygonal column, and displayed rotatably around a centre axis of said polygonal column.

3. The information processing apparatus according to claim 2, wherein said polygonal column rotates around said centre axis according to an automatic selecting operation to select one panel at random.

4. The information processing apparatus according to claim 1, wherein said plurality of files or folders are in the form of hierarchy, and said plurality of panels are grouped every hierarchy and displayed.

5. The information processing apparatus according to claim 4, wherein the panels within the group in each hierarchy are respectively arranged so as to form the side of the polygonal column, the polygonal columns formed every hierarchy are arranged adjacent to each other so that centre axes are made in common, and each polygonal column is displayed rotatably around the common centre axis.

6. The information processing apparatus according to claim 4, wherein a panel of one hierarchy of panels within the group in each hierarchy is selected whereby a panel showing an element within a lower hierarchy corresponding to the selected panel is displayed at a display position of a hierarchy on the lower side of said hierarchy.

7. An information processing apparatus, comprising:
    means for displaying an image;
    means for forming at least a part of a three-dimensional body by a plurality of panels having attached thereto images corresponding to a plurality of files or folders on a screen of the image displaying means, and displaying at least a panel by rendering the panel closest to and parallel with the screen,
    wherein the panel forming at least the part of said three-dimensional body is displayed to be changed according to a copy restriction frequency.

8. The information processing apparatus according to claim 7, wherein said panel is displayed so that thin elements according to the copy restriction frequency are superposed.

9. An information processing method comprising the steps of:
    forming at least a part of a three-dimensional body by a plurality of panels having attached thereto images corresponding to a plurality of files or folders attached on a screen of an image display means;
    preparing a playlist, which lists the order in which said plurality of files or folders are executed, said means for preparing a playlist configured to record, store, and play back the playlist, wherein said playlist is arranged to be displayed on said three-dimensional body: and
    displaying at least a panel by rendering the panel closest to and parallel with the screen.

10. The information processing method according to claim 9, wherein said plurality of panels are arranged so as to form a side of a polygonal column, and displayed rotatably around a centre axis of said polygonal column.

11. The information processing method according to claim 9, wherein said plurality of files or folders are in the form of hierarchy, and said plurality of panels are grouped in each hierarchy and displayed.

12. The information processing method according to claim 11, wherein the panels within the group in each hierarchy are respectively arranged so as to form a side of a polygonal column, the polygonal columns formed in each hierarchy are arranged adjacent to each other so that centre axes are made in common, and each polygonal column is displayed rotatably around the common centre axis.

13. The information processing method according to claim 11, wherein a panel of one hierarchy of panels within the group in each hierarchy is selected whereby a panel showing an element within a lower hierarchy corresponding to the selected panel is displayed at a display position of a hierarchy on the lower side of said hierarchy.

14. A computer program, stored in a tangible storage medium, for arranging and displaying a three-dimensional representation of a plurality of files or folders, the program comprising executable instruction that cause a computer to:
    form at least a part of a three-dimensional body by a plurality of panels having attached thereto images corresponding to said plurality of files or folders on a screen of an image display means;

prepare a playlist, which lists the order in which said plurality of files or folders are executed, said means for preparing a playlist configured to record, store, and play back the playlist, wherein said playlist is arranged to be displayed on said three-dimensional body; and display at least a panel by rendering the panel closest to and parallel with the screen.

15. The computer program according to claim 14, wherein executable instructions that cause a computer to form at least a part of a three-dimensional body by a plurality of panels further includes executable instructions that cause a computer to arrange said plurality of panels so as to form a side of a polygonal column, and displayed rotatably around a centre axis of said polygonal column.

16. The computer program according to claim 14, wherein executable instructions that cause a computer to form at least a part of a three-dimensional body by a plurality of panels further includes executable instruction that cause a computer to configure said plurality of files or folders are in the form of hierarchy, and said plurality of panels are grouped every hierarchy and displayed.

* * * * *

UNITED STATES PATENT AND TRADEMARK OFFICE
CERTIFICATE OF CORRECTION

| | | |
|---|---|---|
| PATENT NO. | : 6,880,132 B2 | Page 1 of 1 |
| APPLICATION NO. | : 09/947553 | |
| DATED | : April 12, 2005 | |
| INVENTOR(S) | : Takuya Uemura | |

It is certified that error appears in the above-identified patent and that said Letters Patent is hereby corrected as shown below:

Col. 10, Claim 9, line 33, delete "means for".

Signed and Sealed this

Twenty-second Day of January, 2013

David J. Kappos
*Director of the United States Patent and Trademark Office*